United States Patent Office 2,718,528
Patented Sept. 20, 1955

2,718,528
PROCESS FOR THE PRODUCTION OF OXIMES

Josef H. Pieper, Berlin-Lichterfelde-West, Germany, assignor, by mesne assignments, to Hercules Powder Company, Wilmington, Del., a corporation of Delaware No Drawing. Application February 10, 1954,
Serial No. 409,528

11 Claims. (Cl. 260—566)

This invention relates to the preparation of oximes and, more particularly, to an improved process of oxidizing amines with hydrogen peroxide to the corresponding oximes.

It has recently been found that oximes can be prepared by converting aliphatic or alicyclic primary amines, whose amino group is bound to a primary or secondary carbon atom, with hydrogen peroxide in the presence of salts of the acids of tungsten, molybdenum, or uranium as catalysts, into the corresponding aldoximes and ketoximes. The tungstates, molybdates, or uranates, or the corresponding per salts used as catalysts for the oxidation, can be the alkali or ammonium salts as well as salts of the amines being oxidized, which salts can be obtained by dissolving the above-mentioned acids in aqueous solutions of the amine. However, in this conversion the catalysts also act to decompose the hydrogen peroxides, whereby undesired losses in oxygen result and such oxygen is lost for the oxidation of the amine. In addition, when higher concentrations of catalyst or peroxide and higher temperatures are used, oxidation products are formed, which exceed the oxime stage; i. e., ketones, nitro compounds, etc., are formed. Therefore, it was necessary, in the processes used heretofore, to control the addition of the hydrogen peroxide to the reaction mixture very carefully so as to avoid any excess. At the same time it was also necessary to keep the temperature below 30° C. by cooling, and preferably a temperature of around 15° C. was used. Even if these conditions are maintained, considerable amounts of higher oxidation products are formed, which contaminate the oxime obtained and necessitate a special purification process, to say nothing of the resulting loss in yield of the desired oxime. Owing to the accumulation of the higher oxidation products in the reaction solution, it is also very difficult to carry out a continuous oximation. Attempts to repress the decomposition of the hydrogen peroxide by the use of silicates, metaphosphates, or polyphosphates were without any effect. It was not possible to reduce the loss in hydrogen peroxide in this way.

In accordance with this invention it has been found that the decomposition of hydrogen peroxide in the reaction mixture is repressed by the addition of an alkali metal salt of nitrilotriacetic acid or of ethylenediaminetetraacetic acid. In addition, the side reaction, wherein higher oxidation products are formed, is reduced to a minimum. This latter advantage is very important, especially when the process of oximation is carried out continuously. Normally in the continuous oximation, the oxime or the corresponding addition compound which is formed between the amine and the oxime is removed from the reaction solution by supercooling, salting out, and filtration, while the higher oxidation products, such as nitro compounds, nitriles, etc., and the excess of unreacted amine are led back as residual reaction solution. In this way the undesirable side reaction products are accumulated in the returned solution. These oxidation compounds must be removed from the residual reaction solution because of the great difficulties they cause due to their nature. Therefore, it is an advantage to keep the reaction free from such by-products from the very beginning by addition of the compounds mentioned above.

In order to suppress the formation of by-products as much as possible, it was previously necessary to carry out the reaction at temperatures below 30° C., preferably at 15° C. Since the oximation is accompanied by a strong heating-up due to the exothermic reaction, intense cooling of the reaction solution was required. Now the conversion in accordance with the invention can be carried out also at higher temperatures, as, for example, 80° C. and above, with the use of the alkali salts of nitrilotriacetic acid and ethylenediaminetetraacetic acid. Without this addition, such temperatures would lead to an explosive reaction, aside from the fact that, owing to the excessively formed by-products, the small amount of oxime obtained would make the process useless. The omission of the intense cooling during the reaction is a considerable advantage of the invention. Another advantage of the use of higher temperatures consists in the fact that the reaction velocity during the oximation is increased considerably, which is of great importance especially in continuous operation.

The oxime formed during the reaction precipitates as an amine—oxime addition product in the form of crystalline needles when the reaction solution is cooled. Filtration furnishes a pasty cake which contains enclosed considerable amounts of filtrate. The latter decreases the amount of residual reaction solution that is recovered and hence causes undesirable amine and catalyst losses. With the use of salts of the type of nitrilotri- or ethylenediaminetetra-acetic acid, a considerably improved filterability is observed in the separation of the reaction product. Coarse, easily filterable needles separate which contain only small amounts of residual reaction solution. The resistance of the crystals to disintegration is essentially improved. In the oximation the catalyst concentration within the reaction solution is of importance in order to obtain optimum yields. The concentration of the catalyst customary up to now could be reduced more than 50% in the presence of the salts of the type of the nitrilotri- or ethylenediaminetetra-acetic acid maintaining the same amounts of other reactants. Consequently, the catalyst losses unavoidable heretofore are reduced even further.

The following examples show the advantage resulting from the addition of alkali salts of nitrilotriacetic acid and ethylenediaminetetraacetic acid to the reaction solution during the oximation of primary amines, without limiting the scope of the invention.

Example 1

One hundred parts of cyclohexylamine is reacted with 280 parts of water with addition of 4.5 parts of cyclohexylamine tungstate, 3 parts of sodium ethylenediaminetetraacetate, 14 parts of sodium sulfate, and 96 parts of 35% hydrogen peroxide for one hour with stirring and cooling. The reaction temperature is 15° C. Then the mass is cooled to 0° C. within half an hour. The precipitate formed, i. e., the cyclohexylamine—cyclohexanone oxime addition product, is separated from the reaction solution in crystalline form. Ninety-six parts of cyclohexylamine—cyclohexanone oxime is obtained. After cleavage of the addition compound into cyclohexylamine and cyclohexanone oxime, 51.4 parts of oxime with a melting point of 88° C. and 44.6 parts of amine are obtained. The cyclohexylamine is returned with the residual reaction solution into the process. The cyclohexanone oxime is obtained in a yield of 99.2%, referred to the amount of converted amine.

Example 2

One hundred parts of cyclohexylamine is reacted with 280 parts of water and 2.3 parts of ammonium tungstate in the presence of 3 parts of sodium nitrilotriacetate and 96 parts of 35% hydrogen peroxide with stirring. Thereby the reaction solution heats up to 96° C. The reaction period is 15 minutes. For the separation of the amine—oxime, the reaction solution is cooled subsequently to 0° C., the precipitate is separated from the reaction solution, and 88 parts of cyclohexylamine—cyclohexanone oxime is obtained as reaction product. After further treatment of the addition compound, 47 parts of cyclohexanone oxime with a melting point of 88° C. is obtained. Therefore, the yield is 95% reaction product, referred to the amount of amine converted in the reaction.

What is claimed and desired to protect by Letters Patent is:

1. The process of preparing an oxime which comprises oxidizing a primary amine with hydrogen peroxide in the presence of a salt of an acid selected from the group consisting of acids of tungsten, molybdenum, and uranium and in the presence of an alkali metal salt of an acid selected from the group consisting of nitrilotriacetic acid and ethylenediaminetetraacetic acid at a temperature of at least about 15° C.

2. The process according to claim 1 wherein the reaction is carried out at a temperature of about 100° C.

3. The process according to claim 1 wherein the reaction is carried out as a continuous process by removing the amine—oxime addition compound that is formed, separating the amine from the oxime, and returning the unreacted amine to the oxidation reaction.

4. The process of preparing an oxime which comprises oxidizing cyclohexylamine with hydrogen peroxide in the presence of a salt of an acid of the group consisting of acids of tungsten, molybdenum, and uranium and in the presence of an alkali metal salt of an acid of the group consisting of nitrilotriacetate acid and ethylenediaminetetraacetic acid at a temperature of about 15° C.

5. The process of preparing an oxime which comprises oxidizing cyclohexylamine with hydrogen peroxide in the presence of a salt of an acid of the group consisting of acids of tungsten, molybdenum, and uranium and in the presence of an alkali metal salt of an acid of the group consisting of nitrilotriacetate acid and ethylenediaminetetraacetic acid at a temperature of about 100° C.

6. The process of preparing an oxime which comprises oxidizing cyclohexylamine with hydrogen peroxide in the presence of a salt of an acid of tungsten, and in the presence of an alkali metal salt of nitrilotriacetate acid at a temperature of at least about 15° C.

7. The process of preparing an oxime which comprises oxidizing cyclohexylamine with hydrogen peroxide in the presence of a salt of an acid of molybdenum, and in the presence of an alkali metal salt of nitrilotriacetate acid at a temperature of at least about 15° C.

8. The process of preparing an oxime which comprises oxidizing cyclohexylamine with hydrogen peroxide in the presence of a salt of an acid of uranium, and in the presence of an alkali metal salt of nitrilotriacetate acid at a temperature of at least about 15° C.

9. The process of preparing an oxime which comprises oxidizing cyclohexylamine with hydrogen peroxide in the presence of a salt of an acid of tungsten, and in the presence of an alkali metal salt of ethylenediaminetetraacetic acid at a temperature of at least about 15° C.

10. The process of preparing an oxime which comprises oxidizing cyclohexylamine with hydrogen peroxide in the presence of a salt of an acid of molybdenum, and in the presence of an alkali metal salt of ethylenediaminetetraacetic acid at a temperature of at least about 15° C.

11. The process of preparing an oxime which comprises oxidizing cyclohexylamine with hydrogen peroxide in the presence of a salt of an acid of uranium, and in the presence of an alkali metal salt of ethylenediaminetetraacetic acid at a temperature of at least about 15° C.

No references cited.